(12) United States Patent
Elliott

(10) Patent No.: US 6,367,540 B1
(45) Date of Patent: Apr. 9, 2002

(54) PORTABLE LIQUID COOLING AND HEATING APPARATUS

(76) Inventor: Frank S. Elliott, 1208 E. Christy Dr., Phoenix, AZ (US) 85020

( * ) Notice: Subject to any disclaimer, the term of this patent is extended or adjusted under 35 U.S.C. 154(b) by 0 days.

(21) Appl. No.: 09/110,348

(22) Filed: Jul. 6, 1998

(51) Int. Cl.⁷ ................................................ F28D 1/06
(52) U.S. Cl. ........................ 165/74; 165/75; 165/163; 62/436; 62/460
(58) Field of Search .................. 165/48.1, 46, 163, 165/74, 75; 62/420, 436, 439, 460, 461

(56) References Cited

U.S. PATENT DOCUMENTS

| 665,389 A | * | 1/1901 | Bosmann | 62/460 |
| 1,046,727 A | * | 12/1912 | Blenz et al. | 62/420 |
| 2,198,822 A | * | 4/1940 | Karge | 62/461 |
| 2,885,189 A | * | 5/1959 | MacCracken | 165/74 X |
| 3,224,218 A | * | 12/1965 | New | 62/239 |
| 3,387,650 A | * | 6/1968 | Hoffmann et al. | 165/75 |
| 3,782,132 A | * | 1/1974 | Lohoff | 165/46 X |
| 4,027,727 A | * | 6/1977 | Pullens | 62/236 X |
| 4,129,994 A | * | 12/1978 | Ku | 62/236 X |
| 4,407,356 A | * | 10/1983 | DeLau | 165/163 X |
| 4,821,354 A | * | 4/1989 | Little | 165/46 X |
| 4,841,742 A | * | 6/1989 | Biby | 62/420 |
| 5,762,129 A | * | 6/1998 | Elliott | 62/420 X |

FOREIGN PATENT DOCUMENTS

JP        404363521   * 12/1992 ................... 165/74

* cited by examiner

Primary Examiner—Christopher Atkinson
(74) Attorney, Agent, or Firm—H. Gordon Shields

(57) ABSTRACT

A portable housing holds a quantity of ice and the melt water from the ice or cooled water or cooled liquid is circulated through a heat exchanger. A blower circulates air from the room through the heat exchanger and back into the room for cooling the room. The housing includes a relatively large chamber for holding the ice and a relatively smaller chamber in which the blower is disposed. Melt water from the ice, or cooled water or cooled liquid, is pumped through the heat exchanger and from the heat exchanger the liquid flows by gravity back to the ice and water chamber.

9 Claims, 1 Drawing Sheet

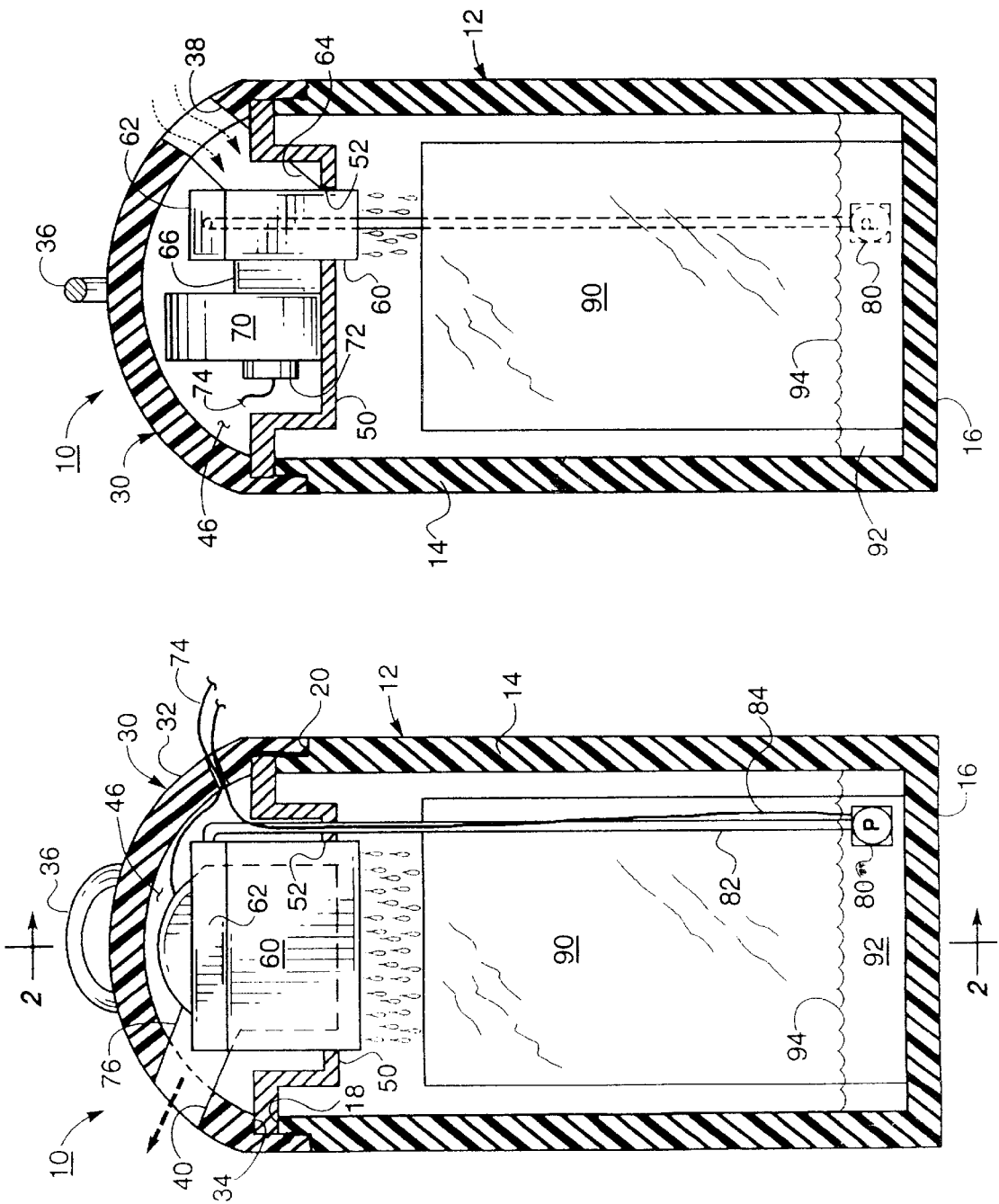

PORTABLE LIQUID COOLING AND HEATING APPARATUS

BACKGROUND OF THE INVENTION

1. Field of the Invention

This invention relates to portable apparatus for cooling and heating air in a room or the like and, more particularly, to the cooling of air by using ice and ice water for cooling through a heat exchanger.

2. Description of the Prior Art

There are essentially two types of systems for cooling air, the simplest is an evaporative air cooler where pads are soaked with water and a blower is used to blow air through the soaked pads. The air is evaporatively cooled as it moves through the soaked pads and is then blown into a room, a building, etc. This type of evaporative air cooling system functions relatively well in situations of relatively low humidity. As the humidity rises, efficiency of evaporated air cooling systems decreases.

The second general system of cooling air is a refrigeration system in which air is blown past evaporator coils through which a refrigerant flows.

An alternate system of the latter is the use of a refrigerant to cool water, and the chilled water is passed through coils and air is blown past the coils and heat is exchanged. The cooled air is then circulated through a building, room, etc. U.S. Pat. No. 5,762,129, the inventor of which is the inventor of the present invention, discloses two general types of cooling (or heating) systems having a generally horizontal configuration. Two types are illustrated, open systems in which the coolant medium is circulated and cooled and recirculated, and a closed loop type system in which a coolant medium is circulated through a heat exchanger and a separate medium is used to cool the circulating coolant medium.

SUMMARY OF THE INVENTION

The invention described and claimed herein includes a relatively small preferably circular portable housing in which is disposed a quantity of ice and cooled water. The ice cools the water, and a submersible pump is used to pump the cooled water to a heat exchanger. Within the housing is a separate chamber in which a blower and a heat exchanger are disposed. The pump is used to pump water from the melting ice through the heat exchanger, and a blower is used to pull air through the heat exchanger. The cooled air is blown into the room in which the apparatus is disposed. The use of hot water instead of cold water allows the apparatus to be used as a portable heater. The apparatus is vertically oriented and it thus rather compact.

Among the objects of the present invention are the following:

To provide new and useful apparatus for cooling a room;

To provide new and useful apparatus for cooling a room using ice and its melt water as a cooling medium;

To provide new and useful portable apparatus for heating and cooling using a heat exchange medium and a submersible pump and a blower;

To provide new and useful portable apparatus for holding a quantity of ice and its melt water and for circulating the melt water through a heat exchanger and a blower for circulating air through the heat exchanger and into a room in which the apparatus is disposed; and To provide new and useful apparatus including a generally vertically oriented housing utilizing ice and its melt water as a cooling medium in the housing and a heat exchanger and blower disposed above the cooling medium for cooling a room.

BRIEF DESCRIPTION OF THE DRAWING

FIG. 1 is a view in partial section of the apparatus of the present invention.

FIG. 2 is a view in partial section taken generally along line 2—2 of FIG. 1.

DESCRIPTION OF THE PREFERRED EMBODIMENT

FIG. 1 is a view in partial section of cooler apparatus 10 of the present invention. FIG. 2 is a view in partial section of the apparatus 10 taken generally along line 2—2 of FIG. 1. For the following discussion, reference will primarily be made to FIGS. 1 and 2.

Cooler apparatus 10 includes a housing 12 which is generally of a circular configuration includes a circular insulated wall 14. The housing 12 is closed by an insulated bottom wall 16.

There is a rim 18 on the upper end of the circular wall 14, and annular shoulder 20 is disposed outwardly from the rim 18.

The housing 12 is closed by a cap 30. The cap 30 includes a dome 32. The cap 30 is disposed on the shoulder 20 of the housing 12.

A support wall 50 is disposed on the rim 18 and is held in place by the cap 30.

Extending through the dome 32 of the cap 30 are two apertures, including an air in take aperture 38 and an exhaust or air out aperture 40. On the top of the dome 30 is a handle 36.

The support wall 50 includes an aperture 52 through which extends a heat exchanger 60. The heat exchanger 60 includes a header 62 which receives cooling fluid, as will be discussed below.

Disposed on the support wall 50 is a blower 70. The intake air through the aperture 38 flows through the heat exchanger 60 and out through the air out aperture 40 in response to the blower 70. In FIG. 2, a motor 72 is schematically illustrated, with its conductor pair 74 extending to an appropriate current source, not shown.

A submersible pump 80 is disposed slightly above the bottom wall 16. A conduit 82 extends from the submersible pump 80 to the header 62 of the heat exchanger 60. A conductor pair 84 extends from the pump 80. Switches (not shown) are disposed in the conductor pairs 74 and 84, as appropriate. Preferably, the power for the pump 80 and the motor 72 is provided by a 12-volt system, either a battery or a transformed and rectified 12-volt DC current from a 110 volt system.

A block of ice 90 is disposed in the housing 12 on the bottom wall 16. In order to begin the cooling process, water 92 with a minimum level of 94 is placed in the housing 12. The water 92 is then pumped through the conduit 82 by the pump 80 to the header 62 of the heat exchanger 60. The cooled water then flows through the heat exchanger 60 and falls downwardly into the ice block 90 and again pools at the bottom of the housing 12. With the blower motor 72 actuated, air is pulled through the beat exchanger 60 from or through the opening or aperture 38 and into the blower 70 and outwardly from the blower 70 through the opening 40 in the dome of 32 of the cap 30. The air is appropriately ducted, as required, for the most efficient flow of air through the heat exchanger and into the blower. The ducting may be accomplished in any appropriate manner. The ducting is schematically illustrated in FIGS. 1 and 2 by an intake duct 64 and a duct 66 between the heat exchanger 60 and the blower 70 in FIG. 2, and an exhaust duct 76 in FIG. 1.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

What I claim is:

1. Apparatus for cooling an area comprising in combination:
   housing means for holding a quantity of liquid cooling medium, including an insulated wall, a bottom wall, and a rim;
   a support wall disposed on the rim of the housing means and removable for adding the liquid cooling medium to the housing;
   a liquid cooling medium in the housing means below the support wall;
   a heat exchange disposed on the support wall above the liquid cooling medium;
   pump means for pumping the liquid cooling medium to the heat exchanger;
   means for circulating air through the beat exchanger and to the area to be cooled; and
   a top closing the housing means and disposed on the support wall and the housing means and enclosing the heat exchanger and the means for circulating air, and removable with the support wall for adding the liquid cooling medium to the housing means.

2. The apparatus of claim 1 in which the housing means comprises a generally circular housing.

3. The apparatus of claim 1 which further includes means for cooling the liquid cooling medium disposed beneath the support wall.

4. The apparatus of claim 3 in which the liquid cooling medium comprises water, and the means for cooling the liquid cooling medium comprises ice.

5. The apparatus of claim 4 in which the pump means comprises a submersible pump.

6. The apparatus of claim 5 in which the means for circulating air comprises a blower disposed adjacent to the heat exchanger on the support wall.

7. The apparatus of claim 6 in which the top includes aperture means for providing a flow of air to the heat exchanger to be cooled and a flow of cooled air from the heat exchanger to the area to be cooled.

8. Cooling apparatus comprising in combination:
   a generally round housing having a rim
   a quantity of water in the housing;
   a quantity of ice in the water for cooling the water;
   a support wall disposed on the rim of the housing and removable for adding the quantity of water and the quantity of ice in the housing;
   a heat exchanger disposed on the support wall above the water and ice;
   a pump for pumping the water to the heat exchanger;
   means disposed on the support wall for providing a flow of air to be cooled through the heat exchanger; and
   a dome disposed on the support wall and the housing and removable with the support wall for adding the quantities of water and ice to the housing.

9. The apparatus of claim 8 in which the pump comprises a submersible pump disposed in the water.

\* \* \* \* \*